(12) United States Patent
Schzukin et al.

(10) Patent No.: US 7,965,638 B1
(45) Date of Patent: Jun. 21, 2011

(54) POLICING MACHINE INCORPORATING RANDOMIZATION OF RATE THRESHOLD

(75) Inventors: Golan Schzukin, Tel Aviv (IL); Yoav Honig, Kfar Saba (IL)

(73) Assignee: Atrica Israel Ltd., Hod Hasharon (IL)

( * ) Notice: Subject to any disclaimer, the term of this patent is extended or adjusted under 35 U.S.C. 154(b) by 271 days.

(21) Appl. No.: 11/462,108

(22) Filed: Aug. 3, 2006

Related U.S. Application Data

(60) Provisional application No. 60/747,826, filed on May 22, 2006, provisional application No. 60/803,018, filed on May 23, 2006.

(51) Int. Cl.
*G08C 15/06* (2006.01)
(52) U.S. Cl. .............. 370/235.1; 370/229; 370/230; 370/230.1; 370/232; 370/234; 370/235; 708/250
(58) Field of Classification Search ....... 370/229–235.1, 370/252, 253, 241, 241.1, 355, 352, 354, 370/357, 236.2, 236, 392
See application file for complete search history.

(56) References Cited

U.S. PATENT DOCUMENTS

| | | | |
|---|---|---|---|
| 6,333,917 B1 * | 12/2001 | Lyon et al. ............... | 370/236 |
| 6,556,578 B1 * | 4/2003 | Silberschatz et al. ....... | 370/412 |
| 6,591,299 B2 * | 7/2003 | Riddle et al. ............. | 709/224 |
| 6,643,612 B1 | 11/2003 | Lahat et al. | |
| 6,646,988 B1 * | 11/2003 | Nandy et al. ............. | 370/235 |
| 6,675,220 B1 * | 1/2004 | Bergamasco et al. ....... | 709/232 |
| 6,687,247 B1 * | 2/2004 | Wilford et al. ............ | 370/392 |
| 6,904,014 B1 * | 6/2005 | Gai et al. ................ | 370/230.1 |
| 7,177,276 B1 * | 2/2007 | Epps et al. .............. | 370/230 |
| 7,215,637 B1 * | 5/2007 | Ferguson et al. .......... | 370/230.1 |
| 2002/0107908 A1 * | 8/2002 | Dharanikota .............. | 709/203 |
| 2002/0110134 A1 * | 8/2002 | Gracon et al. ............ | 370/412 |
| 2002/0131365 A1 * | 9/2002 | Barker et al. ............. | 370/235 |
| 2003/0067878 A1 * | 4/2003 | Zboril ................... | 370/235 |
| 2003/0081546 A1 * | 5/2003 | Agrawal et al. ........... | 370/229 |
| 2007/0263535 A1 | 11/2007 | Shabtay | |

* cited by examiner

*Primary Examiner* — Jason E Mattis
*Assistant Examiner* — Joey Bednash
(74) *Attorney, Agent, or Firm* — Zaretsky Patent Group PC; Howard Zaretsky

(57) ABSTRACT

A novel policer mechanism that incorporates randomization of the rate threshold which prevents "lockup" and "synchronization" problems associated with prior art policers that employ fixed rate thresholds. In one embodiment, a policer machine utilizes the well known sliding window technique to implement traffic control. In a second embodiment, a policer machine utilizes the well known token bucket technique to implement traffic control. In both embodiments, a random dimension is added to the rate threshold used by each policer algorithm. For the sliding window embodiment, the effect of randomization of the rate threshold is that the policer machine applies a scattering of rate values centered around the desired rate to the incoming traffic. For the token bucket embodiment, a random dimension is added to the empty bucket (i.e. zero tokens) threshold. The effect of randomization of the empty bucket threshold is that the policer machine applies a scattering of token values above the empty bucket threshold value of zero.

19 Claims, 11 Drawing Sheets

POLICING MACHINE INCORPORATING RANDOMIZATION OF RATE THRESHOLD

CROSS REFERENCE TO RELATED APPLICATIONS

This application claims priority under 35 U.S.C. §119(e) to U.S. Provisional Application Ser. No. 60/747,826, filed May 22, 2006, entitled "Policing Machine Incorporating Randomization Of Rate Threshold," and U.S. Provisional Application Ser. No. 60/803,018, filed May 23, 2006, entitled "Policing Machine Incorporating Randomization Of Empty Bucket Threshold," both of which are incorporated herein by reference in their entirety.

FIELD OF THE INVENTION

The present invention relates to the field of data communications and more particularly relates to a policing machine that incorporates randomization of the rate threshold for use in policing inbound traffic flows for adherence to Service Level Agreements (SLAs).

BACKGROUND OF THE INVENTION

The growth in demand for telecommunication services is increasing at an ever-quickening pace. The majority of the demand is being driven by the explosion in the use of the Internet and a steady stream of new applications being introduced which further increase the demand for increased bandwidth. Currently, a large portion of the Internet traffic is still carried by circuit switched transport facilities. In the case of Metropolitan Area Networks (MANs), most of the traffic is transported over SONET/SDH based networks most of which were originally resigned for voice traffic. With time, more and more customers are using the networks for transporting data, video, and other applications, in addition to voice.

The requirements for networked communications within the user community have changed dramatically over the past two decades. Several notable trends in the user community include (1) the overwhelming domination of Ethernet as the core networking media around the world; (2) the steady shift towards data-oriented communications and applications; and (3) the rapid growth of mixed-media applications. Such applications include everything from integrated voice/data/video communications to the now commonplace exchanges of MP3 music files and also existing voice communications which have begun to migrate towards IP/packet-oriented transport.

Ethernet has become the de facto standard for data-oriented networking within the user community. This is true not only within the corporate market, but many other market segments as well. In the corporate market, Ethernet has long dominated at all levels, especially with the advent of high-performance Ethernet switching. This includes workgroup, departmental, server and backbone/campus networks. Even though many of the Internet Service Providers (ISPs) in the market today still base their WAN-side communications on legacy circuit oriented connections (i.e. supporting Frame Relay, xDSL, ATM, SONET), their back-office communications are almost exclusively Ethernet. In the residential market, most individual users are deploying 10 or 100 Mbps Ethernet within their homes to connect PCs to printers and to other PCs (in fact, most PCs today ship with internal Ethernet cards) even though the residential community still utilizes a wide range of relatively low-speed, circuit-oriented network access technologies.

The use of Ethernet, both optical and electrical based, is increasing in carrier networks due to advantages of Ethernet and particularly Optical Ethernet, namely its ability to scale from low speeds to very high rates and its commodity-oriented nature. With the rapid increase in the demand for user bandwidth, and the equally impressive increase in the performance of Ethernet with the LAN environment, the demand for Metropolitan network performance is rapidly increasing. In response, there has been a massive explosion in the amount of fiber being installed into both new and existing facilities. This is true for both the corporate and residential markets.

Transparent LAN Service (TLS), which is also referred to as multipoint-to-multipoint (MP2MP), has been identified as one of the key services to be provided by an Ethernet based metro network (MEN). A TLS that provides virtual Ethernet LAN service is called an E-LAN (Ethernet LAN service) in the MEF standard specifications. TLS implementation in Multi-Protocol Label Switching (MPLS) networks is referred to as Virtual Private LAN Service (VPLS) in Internet Engineering Task Force (IETF) drafts. IEEE 802.1ad specifies provider bridges that implement E-LAN service by means of standard spanning-tree based bridging.

A TLS creates an emulated LAN segment for a given set of users. It provides a layer 2 broadcast domain that is capable of learning and forwarding using Ethernet MAC addresses for a given set of users.

Today, Ethernet is the predominant technology used for Local Area Network (LAN) connectivity and is gaining acceptance as an access technology as well. This is true especially in Metropolitan Area Networks (MANs) and Wide Area Networks (WANs). In a typical scenario, an Ethernet port connects a customer to the Provider Edge (PE) device. Customer traffic is subsequently mapped to a specific MPLS-based Layer 2 Virtual Private Network (VPN).

Traditional LANs provide unicast, broadcast and multicast services. Locations that belong to the same broadcast domain and that are connected via an MPLS network expect broadcast, multicast and unicast traffic to be forwarded to the proper locations. This requires MAC address learning on a per LSP basis, forwarding unicast destination traffic according to the learned information, packet replication across LSPs for multicast/broadcast traffic and for flooding of unknown unicast destination traffic.

One of the key features provided by Metro networks is enhanced SLA support. In many networks, the key for providing SLA to services is to enforce limits on the traffic rates allowed from each service and on the traffic rates of each service for which the SLA is applied. This is usually performed by using policers at the ingress or other points in the network. The policers may drop or mark the traffic with an indication, i.e. discard eligibility (DE) bit, of the treatment that it should get in the rest of the network. In order to provide enhanced SLA support, however, the network must provide appropriate SLA measurement capabilities.

Service level agreements typically include parameters and constraints for bandwidth (i.e. frame loss ratio), delay, delay variation (i.e. jitter) and availability. It is commonly required that provider networks provide packet loss measurements for the transport facilities they provide. Customers typically want information on the number of packets that did not make it to their destination. The end-to-end Service Level Agreement (SLA) measurement mechanisms and protocol described in U.S. Pat. No. 6,643,612, entitled "Mechanism And Protocol For Per Connection Based Service Level Agreement Measurement," incorporated herein by reference in its entirety, provides very accurate calculation of delay, jitter and bandwidth (i.e. packet/frame/octet loss) for point-to-point connections.

A common problem, however, occurs in networks when a network node both (1) aggregates several traffic flows together and (2) performs policing on those traffic flows as a single bundle. In particular, the problem is that a situation is created whereby the behavior of the traffic flows and associated policing functions become synchronized or harmonized in such a way that a particular incoming traffic flow is always dropped, while other incoming traffic flows always pass. This behavior is highly undesirable in a network.

An example of this problem will now be presented. A block diagram illustrating several workstations connected to a metro Ethernet network (MEN) comprising prior art conventional edge and core switches is shown in FIG. 1. The example network, generally referenced 20, comprises a plurality of workstations (i.e. nodes) 22, labeled workstation A, B and C, a local Ethernet switch 24 and metro Ethernet network (MEN) 32. The MEN comprises plurality of switches including edge switch D 26, E 30 and core switch F 28.

The traffic flow from nodes A and B are 100 Mbps each. Switch D applies policing to its incoming traffic flows such that only 100 Mbps is allowed to be forwarded for the combined aggregate traffic flow from nodes A and B. This is because switch D applies a rate threshold of 100 Mbps to its incoming traffic flow. If both incoming traffic flows have the same packet size, the policer may get "locked" in a situation whereby the bandwidth of traffic forwarded by switch D is narrowed to 100 Mbps whereby the entire traffic flow from node A passes (i.e. forwarded) and the entire traffic flow from node B is dropped (or vice versa). The result that is actually desired in this case, however, would be to narrow the incoming traffic flow from nodes A and B to 50 Mbps each rather than dropping the entire flow of packets from either node A or node B.

An example of this "lockup" problem is illustrated in FIG. 2 which shows the behavior of a prior art policing machine that incorporates a prior art sliding window mechanism. The well-known sliding window mechanism operates as follows. For every incoming packet, the policer checks whether the bits accumulated in the previous time window exceeds the rate threshold. If the accumulated bits are below the threshold, the bits in the packet will be accumulated and packet will be allowed to pass. If the accumulated bits are over the threshold, the packet is dropped, and the number of bits in the packet will not be taken into account.

With reference to FIG. 2, the policer of switch D, operating with a fixed rate threshold, receives six packets. Three of the received packets are passed and three received packets are dropped. The three received packets that pass and are accumulated are all from node A while the three packets that are dropped and not accumulated are all from node B. A disadvantage of this policer behavior is that over time, the number of packets dropped will continue to be split unequally between the two incoming flows. This is due to the "lockup" or "lock step" caused by the policer mechanism and the particular traffic bandwidths and rate thresholds of the nodes and switches in the network.

Another example of the "lockup" problem described above is illustrated in FIG. 3 which shows the behavior of a prior art policing machine that incorporates a prior art token bucket mechanism. The well-known token bucket mechanism operates as follows. Normally, data flows into the token bucket in units of tokens which represent packets or bytes. Tokens flow into the bucket at rate "r". Once the bucket is full of tokens (i.e. "s" tokens), all tokens that are subsequently received are discarded. Each token is worth a defined number of bytes, e.g., one byte.

In operation, when a packet arrives, if there are a number of tokens in the bucket at least equal to the number of bytes in the packet, the policing decision for that packet is to pass the packet. If there is an insufficient number of tokens in the bucket, then the policing decision for that packet is to drop the packet.

With reference to FIG. 3, the saw tooth represents the bucket filling up with tokens. The rate of filling the bucket, however, is in lock step with the incoming traffic flow rates from nodes A and B. As a result, packets from node B are always dropped while packets from node A always pass. The bucket never fills up fast enough to permit packets from node B to pass. Due to the use of a fixed rate threshold (i.e. an empty bucket), and the "synchronization" of the rate of filling with the rate of packets being received, node B over time is continually denied access to any bandwidth at all.

There is thus a need for a policer mechanism that avoids the problem associated with prior art policers. In particular there is a need for a policer that can regulate incoming traffic flows to a network switch that is able to avoid getting "locked" or "synchronized" to incoming traffic flows wherein traffic from one node is entirely dropped.

SUMMARY OF THE INVENTION

The present invention is a policer mechanism that overcomes the problems and disadvantages of the prior art. The policer mechanism incorporates randomization of the rate threshold which prevents the "lockup" and "synchronization" problems associated with prior art policers that employ fixed rate thresholds. The invention has application to a wide variety of policing applications. The policer machine of the present invention is particularly applicable to ingress policers used in provider edge switches and in ingress and/or middle policers used in provider core switches. The invention takes into consideration Committed Information Rate (CIR) and Excess Information Rate (EIR) based policy that is to be enforced at the ingress of the network as well as policy that is enforced in the middle of the network.

The policer machine of the present invention can be implemented using any suitable core policing scheme. Two example policer machine embodiments are presented infra wherein one embodiment comprises a policer machine that utilizes the well known sliding window technique to implement traffic control. A second embodiment comprises a policer machine that utilizes the well known token bucket technique to implement traffic control.

In accordance with the present invention, in both embodiments, a random dimension is added to the rate threshold used by each policer algorithm. For the sliding window embodiment, the effect of randomization of the rate threshold is that the policer machine applies to the incoming traffic a scattering or wave of rate values centered around the desired rate rather than a rate threshold that has a constant fixed value. For the token bucket embodiment, a random dimension is added to the empty bucket (i.e. zero tokens) threshold. The effect of randomization of the empty bucket threshold is that the policer machine applies a scattering or wave of token values above the empty bucket threshold rather than continuously use a value of zero as the fixed empty bucket threshold value.

The present invention is suitable for use in networks that require policers for implementing traffic control functions. In particular, the invention is applicable in provider edge and core switches in Metro Ethernet Networks (MENS) and Metropolitan Area Networks (MANs) that implement E-Line (P2P), E-LAN (TLS connections, VPLS connections, 802.1ad, etc.). Note that the invention is applicable in any network that employs policers that are required to condition traffic from a plurality of incoming traffic flows.

It is important to also note that the invention is not limited by the type of network in use, the PHY layer, the type of signaling in use or by whether provisioning is based on signaling or is performed in the management plane. The invention is applicable to other networks as well.

Note also that the invention is suited for implementation in hardware such as a network processor (which may comprise a network-processor chip, an FPGA, an ASIC, etc.), adapted to implement the policer machine of the present invention, software or a combination of hardware and software. In one embodiment, a network device comprising a processor, memory, etc. is operative to execute software adapted to implement the policer machine of the present invention.

Further, some aspects of the invention described herein may be constructed as software objects that are executed in embedded devices as firmware, software objects that are executed as part of a software application on either an embedded or non-embedded computer system such as a central processing unit (CPU), digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a policer for use in a network switch coupled to a network, the network switch adapted to receive a plurality of incoming traffic flows over the one or more links comprising a connection database adapted to store a plurality of rate parameters, including one or more rate thresholds, corresponding to a connection ID associated with a received packet, a random number generator operative to generate a random number for each received packet, means for generating a randomized rate threshold as a function of the one or more rate thresholds and the random number and a policing calculator operative to calculate a policing decision in accordance with the received packet, the plurality of rate parameters and the randomized rate threshold.

There is also provided in accordance with the invention, a method of policing a plurality of incoming traffic flows in a network switch coupled to a network, the method comprising the steps of for each packet received, retrieving from a connection database a plurality of rate parameters, including one or more rate thresholds, corresponding to a connection ID associated with the received packet, generating a random number for each packet received, generating a randomized rate threshold as a function of the one or more rate thresholds and the random number and calculating a policing decision based on the received packet, the plurality of rate parameters and the randomized rate threshold.

There is further provided in accordance with the invention, a policer for use in a network switch coupled to a network, the network switch adapted to receive a plurality of incoming traffic flows over the one or more links comprising a connection database adapted to store a plurality of committed information rate (CIR) and excess information rate (EIR) rate parameters corresponding to a connection ID associated with a received packet, a random number generator operative to generate a random number for each received packet, means for generating randomized CIR and EIR rate thresholds as a function of the plurality of CIR and EIR rate parameters and the random number and a policing calculator operative to establish a current sliding window during which incoming CIR and EIR traffic is accumulated and for each incoming packet, deciding whether to forward, mark as discard eligible or drop the packet as a function of the accumulated CIR and EIR traffic and the randomized CIR and EIR rate thresholds.

There is also provided in accordance with the invention, a method of policing a plurality of incoming traffic flows in a network switch coupled to a network via one or more communication links, the method comprising the steps of for each packet received, retrieving from a connection database a plurality of committed information rate (CIR) and excess information rate (EIR) rate parameters corresponding to a connection ID associated with a received packet, generating a random number for each packet received, generating randomized CIR and EIR rate thresholds as a function of the CIR and EIR rate parameters and the random number, establishing a current sliding window during which incoming CIR and EIR traffic is accumulated and for each incoming packet, deciding whether to forward, mark as discard eligible or drop the packet as a function of the accumulated CIR and EIR traffic and the randomized CIR and EIR rate thresholds.

There is further provided in accordance with the invention, a policer for use in a network switch coupled to a network, the network switch adapted to receive a plurality of incoming traffic flows over the one or more links comprising a connection database adapted to store a plurality of rate parameters corresponding to a connection ID associated with a received packet, a random number generator operative to generate a random number for each received packet and a token bucket based policing calculator operative to for each received packet, update a token bucket depth as a function of the current bucket depth, the random number and the rate parameters so as to yield a randomized token bucket depth and pass a received packet if the randomized token bucket depth is greater than the number of bytes in the received packet.

There is also provided in accordance with the invention, a method of policing a plurality of incoming traffic flows in a network switch coupled to a network, the method comprising the steps of for each packet received, retrieving from a connection database a plurality of rate parameters corresponding to a connection ID associated with a received packet, generating a random number for each packet received, for each received packet, updating a token bucket depth as a function of the current bucket depth, the random number and the rate parameters so as to yield a randomized token bucket depth and passing a received packet if the randomized token bucket depth is greater than the number of bytes in the received packet.

There is further provided in accordance with the invention, a provider core switch for use in the middle of an Ethernet based network comprising a plurality of line cards incorporating one or more ports for interfacing the provider switch to other provider switches, each line card comprising a plurality of ports, each port coupled to a network communications link, a packet processing engine coupled to the plurality of ports, the packet processing engine for determining forwarding decision and destination queue for each ingress packet, wherein the packet processing engine comprises a policer operative to generate a random number for each packet received, for each received packet, update a token bucket depth as a function of a current bucket depth, the random number and one or more rate parameters so as to yield a randomized token bucket depth, pass a received packet if the randomized token bucket depth is greater than the number of bytes in the received packet, a queue manager coupled to the packet processing engine and switching means coupled to the queue manager and adapted to provide switching fabric functionality to the provider core switch.

There is also provided in accordance with the invention, a method of policing a plurality of incoming traffic flows in a network switch coupled to a network, the method comprising the steps of generating a random number for each packet received, generating a randomized rate threshold as a function of one or more predetermined rate thresholds and the random number and calculating a policing decision based on the randomized rate threshold.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
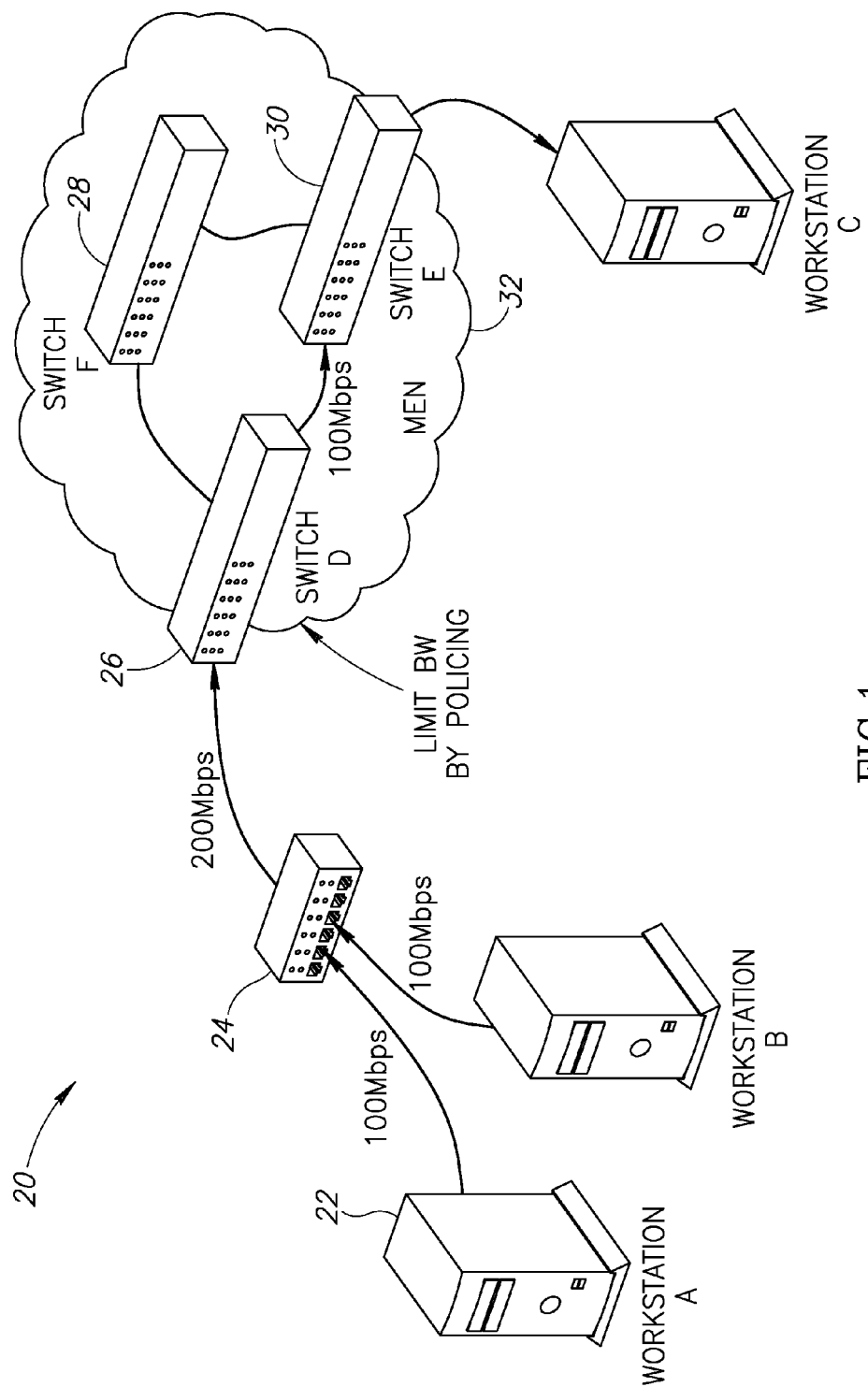
FIG. 1 is a block diagram illustrating a prior art example network comprising several workstations connected to a metro Ethernet network (MEN)

The following notation is used throughout this document.

| Term | Definition |
|---|---|
| ASIC | Application Specific Integrated Circuit |
| ATM | Asynchronous Transfer Mode |
| CD-ROM | Compact Disc-Read Only Memory |
| CIR | Committed Information Rate |
| CLP | Cell Loss Priority |
| CPU | Central Processing Unit |
| CSIX | Common Switch Interface |
| DAT | Digital Audio Tape |
| DE | Discard Eligibility |
| DSCP | Differentiated Services Code Point |
| DSL | Digital Subscriber Line |
| DSP | Digital Signal Processor |
| DVD | Digital Versatile Disk |
| EEPROM | Electrically Erasable Programmable Read Only Memory |
| EIR | Excess Information Rate |
| E-LAN | Ethernet LAN Service |
| E-Line | Ethernet Line Service |
| EPROM | Erasable Programmable Read Only Memory |
| FDDI | Fiber Distributed Data Interface |
| FE | Fast Ethernet |
| FPGA | Field Programmable Gate Array |
| GE | Gigabit Ethernet |
| IEEE | Institute of Electrical and Electronic Engineers |
| IETF | Internet Engineering Task Force |
| IP | Internet Protocol |
| L3VPN | Layer 3 Virtual Private Network |
| LAN | Local Area Network |
| LSB | Least Significant Bit |
| LSP | Label Switched Path |
| LSR | Label Switched Router |
| MAC | Media Access Control |
| MAN | Metropolitan Area Network |
| MEF | Metro Ethernet Forum |
| MEN | Metro Ethernet Network |
| MP2MP | Multipoint-to-Multipoint |
| MPLS | Multi-Protocol Label Switching |
| MSB | Most Significant Bit |
| NIC | Network Interface Card |
| NMS | Network Management System |
| OA&M | Operations, Administration & Maintenance |
| P2P | Point to Point |
| PC | Personal Computer |
| PDH | Plesiochronous Digital Hierarchy |
| PDU | Protocol Data Unit |
| PE | Provider Edge |
| PPE | Packet Processing Engine |
| QoS | Quality of Service |
| RAM | Random Access Memory |
| RFC | Request for Comment |
| ROM | Read Only Memory |
| RPR | Resilient Packet Ring |
| SDH | Synchronous Digital Hierarchy |
| SLA | Service Level Agreement |
| SLS | Service Level Specification |
| SONET | Synchronous Optical Network |
| TDM | Time Division Multiplexing |
| TLS | Transparent LAN Services |
| UNI | User to Network Interface |
| VLAN | Virtual Local Area Network |
| VPLS | Virtual Private LAN Service |
| VPN | Virtual Private Network |
| WAN | Wide Area Network. |

DETAILED DESCRIPTION OF THE INVENTION

The present invention is a policer mechanism that overcomes the problems and disadvantages of the prior art. The policer mechanism incorporates randomization of the rate threshold which prevents the "lockup" and "synchronization" problems associated with prior art policers that employ fixed rate thresholds. The invention has application to a wide variety of policing applications. The policer machine of the present invention is particularly applicable to ingress policers used in provider edge switches and in ingress and/or middle policers used in provider core switches. The invention takes into consideration CIR and EIR based policy that is to be enforced at the ingress of the network as well as policy that is enforced in the middle of the network.

The policer machine of the present invention can be implemented using any suitable core policing scheme. Two example policer machine embodiments are presented infra wherein one embodiment comprises a policer machine that utilizes the well known sliding window technique to implement traffic control. A second embodiment comprises a policer machine that utilizes the well known token bucket technique to implement traffic control. A key benefit of the invention is the elimination of the "lockup" problem exhibited by the prior art whereby incoming traffic flows from some nodes are perpetually dropped while traffic flows from other nodes are always passed.

Note that policer mechanism taught by the present invention may be used in any type of policer, including, for example, dual or tri rate policers, ingress policers and color aware middle policers.

Example embodiments are provided to illustrate the policer machine of the present invention. It is not intended, however, that the invention be limited to the configurations and embodiments described herein. It is appreciated that one skilled in the networking, electrical and/or software arts may apply the principles of the present invention to numerous other types of networking devices and network configurations as well, including other types of synchronous data streams and asynchronous transport networks without departing from the spirit and scope of the invention.

In particular, the invention is not limited to the use of TLS, VPLS, E-LAN, IEEE 802.1ad, L3VPN, P2P or any other type of connection or service. Further, the teachings of the present invention can be applied to numerous types of policers, i.e. other than sliding window or token bucket based. It is not intended that the invention be limited to the example embodiments presented herein.

Throughout this document, the terms packet and frame are used interchangeably and are intended to denote a protocol data unit (PDU) adapted to transport data and/or control information from one point to another.

Figure 4:
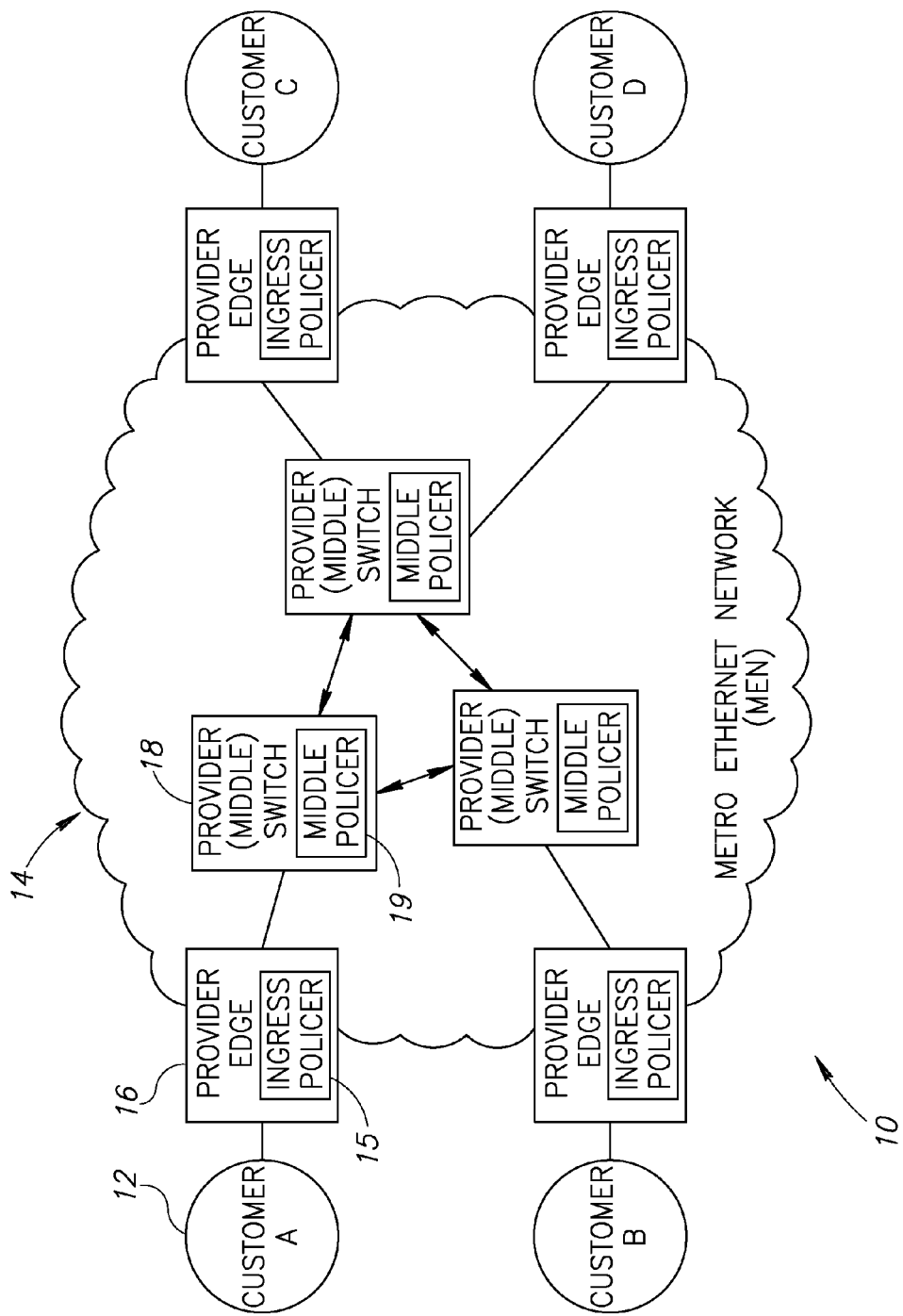
FIG. 4 is a diagram illustrating an example metro Ethernet network providing transparent LAN services to a plurality of clients and comprising a plurality of provider edge and provider core switches incorporating the policer machine of the present invention.

A diagram illustrating an example metro Ethernet network providing transparent LAN services to a plurality of clients and comprising a plurality of provider edge and provider core switches incorporating the policer machine of the present invention is shown in FIG. 4. The example network, generally referenced 10, comprises a plurality of customers 12, labeled customer A through D, connected to a Metro Ethernet Network (MEN) 14. The customers are connected to the MEN via a plurality of provider edge switches 16 each comprising the policer 15 of the present invention. A plurality of provider (middle or core) switches 18, each comprising the policer 19 of the present invention, make up the inner portion of the MEN. Each provider edge switch is connected to a provider middle (or core) switch.

The policer machines within the provider edge switches and the provider middle (or core) switches are operative to implement the policer mechanism of the present invention. The switches are operative to perform standard edge and core switch functions.

The provider edge devices 16 are interconnected via pseudowires (or actual wires) and appear as a single emulated LAN to the clients 12. The provider edge devices may be interconnected through additional core nodes that provide bridging between these pseudowires. Provider edge devices may also contain a bridging function between their UNIs and the pseudowires belonging to the TLS. Each device having TLS bridging functionality is adapted to learn remote MAC address (or MAC address and VLAN tag) to pseudowire associations from traffic received over these pseudo wires and to also learn source MAC address to user port associations from traffic received over user ports. One of two methods for provisioning a TLS is typically used: a management based method or signaling based method. With management based provisioning, a management entity allocates the bridging resources to be used at the different nodes and provisions the pseudowires between them. With signaling based provisioning, the provider edge device typically comprises an edge router capable of running a signaling protocol and/or routing protocols used to configure pseudowires. In addition, it is capable of configuring transport tunnels to other provider edge devices and transporting traffic over these tunnels.

Policing at the Ingress of the Network

In metro Ethernet markets, one of the parameters that can be selected is the Quality of Service (QoS). Quality of service is a term which refers to the set of performance parameters that characterize the traffic over a given connection. Several different classes or levels of QoS are defined two of which are committed traffic and best effort traffic. To enable many services in the metro Ethernet market, a critical QoS parameter is committed information rate (CIR) versus excess information rate (EIR). Committed traffic is guaranteed to make it through the network with a very high probability and should have a very low probability of being dropped. This is a higher class of service and the customer pays a premium price for it.

The excess traffic, however, is not guaranteed to make it through the network and may be provided on a best effort basis. This means that the committed traffic is serviced first and excess traffic is serviced using any bandwidth left in each section in the system. Note that EIR is usually not a service of its own but rather is the EIR portion of the same service. For example, a policer is used at the ingress of the provider network to decide which part of the traffic of a service is excess traffic and therefore should be marked as discard-eligible, and which is committed traffic and therefore should not be marked as discard eligible. As described below, different frames of the same service may be marked as committed or excess traffic according to the bandwidth profile defined in the Service Level Specification (SLS) of that service. From an overall network point of view, the expectation of the service provider and the customer is that if a customer pays a premium price for the committed bandwidth of the service, then committed customer traffic will not be dropped. The expectation of the service provider is that the excess traffic will always be dropped before committed traffic is dropped if at all. Note also that excess traffic is not the same as best effort traffic. For example, there may be a high priority service with excess traffic that is not within its SLA profile.

The Metro Ethernet Forum (MEF) defines Committed Information Rate (CIR) and Excess Information Rate (EIR) values for an Ethernet service. One way to provide the CIR/EIR capability is to use a dual-rate policer at the ingress of the network. For each frame, the policer decides whether it is part of the CIR traffic, part of the EIR traffic or out of profile (in which case the frame is dropped).

To be able to distinguish between committed traffic and excess traffic, in the edge of metro networks, the traffic is classified and policed according to the Service Level Agreement (SLA). The traffic identified from the SLA or from the results of a traffic policing mechanism as excess traffic is marked as discard eligible (DE) while the traffic identified as committed traffic is marked as non-discard eligible. This scheme is also known as the three-color coloring scheme, in which a dual-rate policer marks frames as either green (i.e.

non discard-eligible, part of the CIR profile), yellow (i.e. discard eligible, part of the EIR profile), or red (i.e. out of profile). In many implementations (e.g., according to the MEF definitions), red frames are immediately dropped. In some schemes (e.g., the IETF assured service) three levels of discard eligibility can be marked in the frame, allowing red-color to be marked and forwarded as well).

The frame is then forwarded onto the network with a marking indicating whether it is CIR-compliant (green) or EIR-compliant (yellow). The switches in the middle of the network rely on this marking to decide whether or not to drop the frame in the event of congestion.

Several example ways to mark whether a frame is part of the CIR-conforming traffic or is part of the EIR-conforming traffic include the following. (1) In the case of ATM cells, the Cell Loss Priority (CLP) bit in the header of ATM cells may be used to indicate that the packet is discard eligible. (2) Using a flag in the frame for discard eligibility (i.e. DE flag). If this flag is set, the network drops this frame with higher probability compared to frames in which this flag is not set. Traffic confirming to the CIR is marked with this flag not set. Traffic conforming to the EIR but not to the CIR is marked with this flag set. (3) Encoding priority as well as DE in a single field, e.g., the 802.1P priority field, the MPLS experimental bits or and the Differentiated Services Code Point (DSCP) field in the IP header. The IETF differentiated services assured forwarding scheme described in RFC 2597 defines three levels of discard eligibility marking. An example use of this capability is to forward non-confirming traffic in addition to the EIR and CIR traffic and to give it the highest DE priority. IEEE 802.1ad defines a standard for marking Ethernet frames with priority and discard eligibility.

Provider Switch Embodiment

A network device can be adapted to incorporate the policer mechanism of the present invention. Hardware means and/or software means adapted to execute the mechanism may be incorporated, for example, within the line cards of a network device such as a core switch, access switch, provider edge switch, enterprise switch, Network Management System (NMS), Label Switching Router (LSR), Ethernet LAN switch, network switch or any other wired or wireless network device. The network device may be constructed using any combination of hardware and/or software. A provider switch is defined as any switch used by a service provider. Examples of provider switches include edge switches, core switches and access switches. An enterprise switch is defined as any switch used within an enterprise, such as the switches used within a corporation, college campus, etc.

Figure 5:
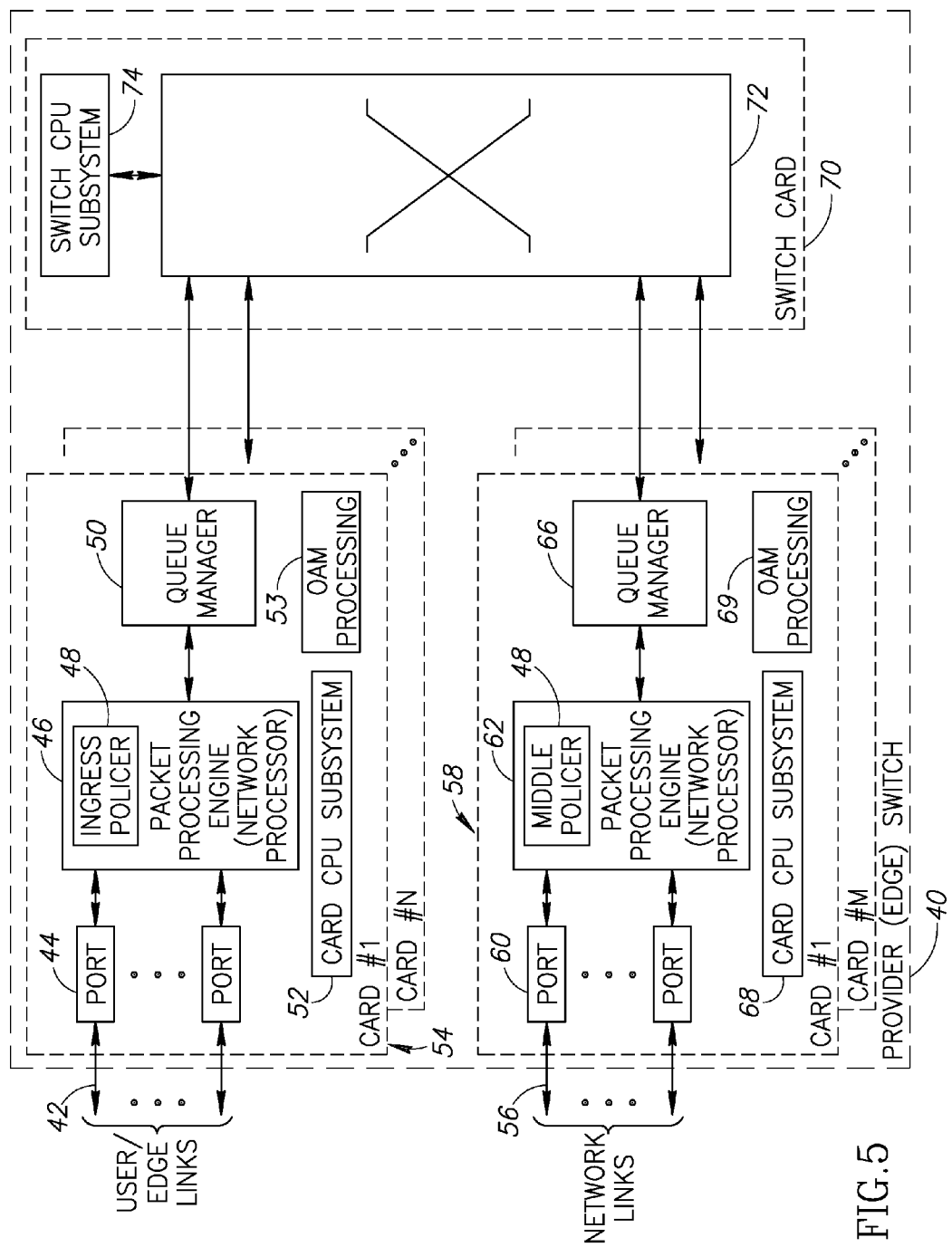
FIG. 5 is a block diagram illustrating an example provider edge/provider core switch incorporating the ingress and middle policer mechanisms of the present invention.
Figure 6:
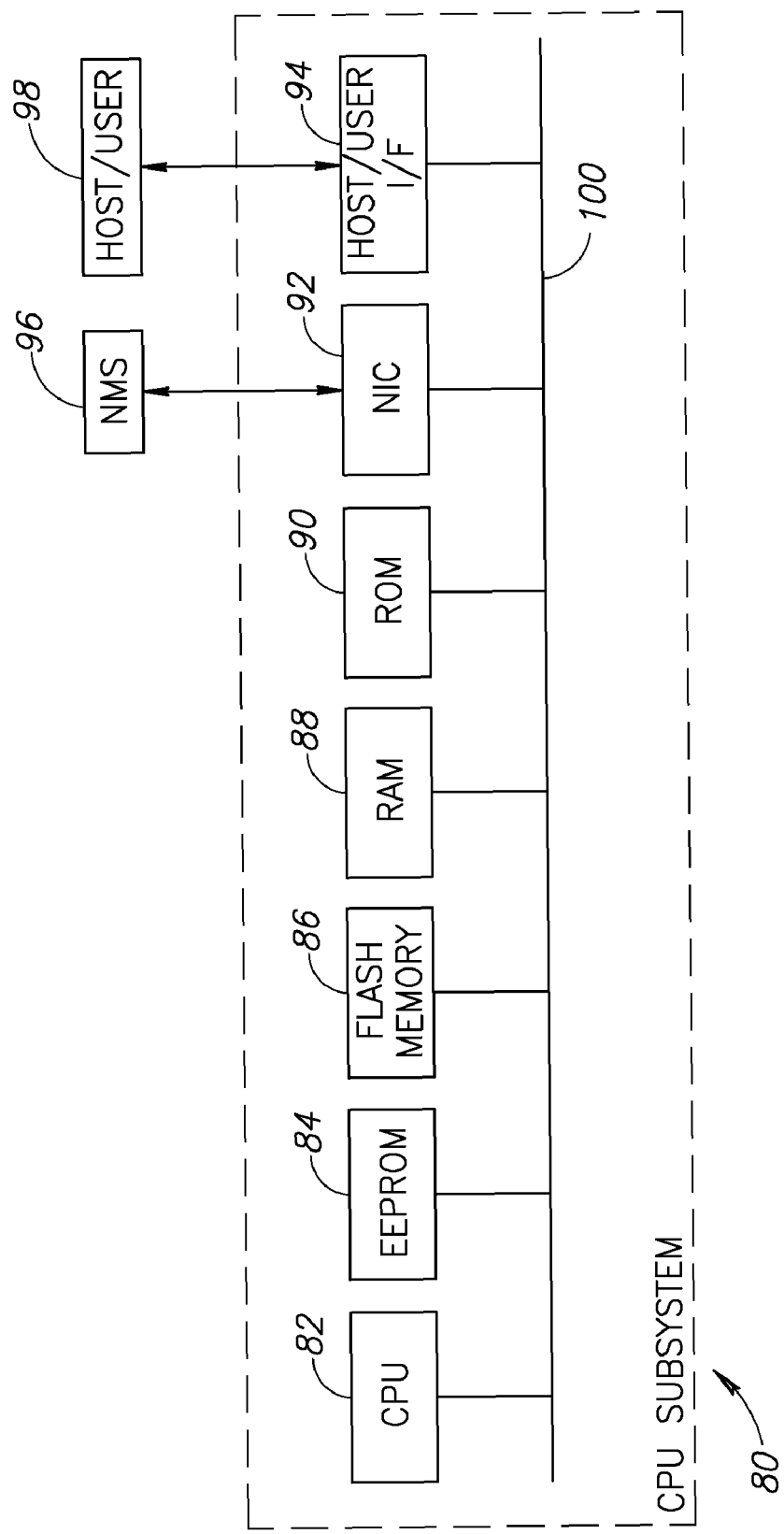
FIG. 6 is a block diagram illustrating the CPU subsystems of the provider edge/provider core switch of FIG. 5 in more detail.

As an example, the invention is applied to a provider edge switch and a provider (core or middle) switch. A block diagram illustrating an example provider edge/provider core switch incorporating the ingress and middle policer mechanisms of the present invention is shown in FIG. 5. A block diagram illustrating the CPU subsystems of the provider edge/provider core switch of FIG. 5 in more detail is shown in FIG. 6. With reference to FIGS. 5 and 6, the provider switch, generally referenced 40, is modularly constructed and comprises a plurality of provider edge line interface cards 54, labeled card #1 through card #N, plurality of provider core line interface cards 58, labeled card #1 through card #M and one or more switch cards 70. Each card 54 comprises a plurality of ports 44, packet processing engine (PPE) 46, queue manager 50, card CPU subsystem 52 and OAM processing module 53. Each card 58 comprises a plurality of ports 60, PPE 62, queue manager 66, card CPU subsystem 68 and OAM processing module 69. The line cards 54 function to provide an interface to users/edge devices communication links 42. The line cards 58 function to provide an interface to network communication links 56. The switch card provides a switching function whereby packets are transferred between line cards (or between ports).

The OAM processing module 53, in combination with the network processor 46, implements a client ingress based policy aware frame loss measurement mechanism. A measurement mechanism suitable for use with the present invention is described in detail in U.S. Publication No. US2007/0263535A1, entitled "Policy Aware Frame Loss Measurement", incorporated herein by reference in its entirety. Note that the functionality of the OAM processing block 53 can be implemented in software (as shown), in hardware or a combination of software and hardware depending on the particular implementation.

Similarly, the OAM processing module 69, in combination with the network processor 62, implements a middle network based policy aware frame loss measurement mechanism such as described in U.S. application Ser. No. 11/383,207 cited supra. Note that the functionality of the OAM processing block 62 can be implemented in software (as shown), in hardware or a combination of software and hardware depending on the particular implementation.

The communication links 42 are terminated at the line cards via the plurality of ports 44. The communication links 56 are terminated at the line cards via the plurality of ports 60. Regardless of what type of links they are connected to, the ports function to provide the PHY interface to the bidirectional communication links. The line interface cards may be adapted to interface to any particular type of link including, for example, any variety of copper or optical based Ethernet, Token Ring, FDDI, SONET/SDH, ATM, RPR. In addition, a line card may have a plurality of ports each adapted to communicate over a different type of link. For connecting to a user or edge device, the port is adapted to connect directly or indirectly through access/aggregation devices to a plurality of users or customer/client edge devices via communication links 42. The client edge ports of the provider switch interface to the user or client edge device via any suitable type of interface, e.g., Gigabit Ethernet (GE), Fast Ethernet (FE), PDH interface (e.g., T1/E1), etc. Similarly, if the port connects to a network link 56, the port functions to interface the line card to other provider switches (i.e. edge or core switches) via any suitable interface such as Optical Ethernet (e.g., 1 GE, 10 GE, etc.), TDM, RPR, etc.

Data received over the links 42 by the ports is forwarded to the packet processing engine (PPE) or network processor 46. Data received over the links 56 by the ports is forwarded to the packet processing engine (PPE) or network processor 62. The packet processing engines 46, 62 perform packet processing on the packets received from the ports. Some of the key functions performed by the packet processing engine include determining the discard eligibility of each packet, calculating a forwarding decision for each packet, determining which queue to forward the packet to and making any necessary changes to a packet.

The packet processing engines 46, 62 comprise both an ingress packet processor (not shown) and an egress packet processor (not shown). The packet processing engine typically also comprises timestamp circuits, clock circuits, memory, counters and CPU interface, means for performing OA&M protocols processing (part of this capability may reside in the CPU as well). The PPE 46 comprises the ingress policer 48 of the present invention which is intended to be located in a provider edge switch and which is operative to make marking decisions based on the contents of the received packet and the current traffic conditions. The PPE 62 comprises the middle policer 48 of the present invention which is intended to be located in a provider (middle) switch and which is operative to make marking decisions based on the contents of the received packets and the current traffic conditions.

The packet processing engine incorporating the policers may be implemented as a microcontroller, microprocessor, microcomputer, ASIC core, FPGA core, network processor, central processing unit (CPU) or digital signal processor (DSP) or any other suitable computing means. Once processing is complete, the packet processing engine passes packets to the queue manager which functions to place the packet in the appropriate ingress queue.

The queue managers function to manage the various queues within the line card. A plurality of queues is typically used wherein separate queues are provided for different priorities, destinations, etc. Note that the invention is not limited to any particular line interface type or link speed. In addition, the invention is not limited to any particular number of communication links or ports, as any number of links and ports of each type may be used. Further, the line interface cards may be adapted to interface to any type of communication links such as any variety of copper or optical based Ethernet, Token Ring, FDDI, SONET/SDH, PDH, ATM, RPR, etc. Note that the queue management system is typically constructed in hardware in order to provide a high bandwidth fast path for data that is capable of keeping up with the line rates of the communication links.

Note that the specific implementation of the line card is not critical to the invention. For example, a single packet processing engine may be adapted to handle a plurality of ports or a plurality of packet processing engines may be used, one for each port. Similarly, a single queue manager per line card may be used or a plurality of queue managers may be used, one for each packet processing engine (in the case multiple packet processing engines are realized). Further, the switch CPU subsystem may be incorporated on the same card as the switching matrix or may be realized on a separate card in the chassis.

Each of the line cards 54 comprises a card CPU subsystem 52 for providing the control, administration and configuration of the line card. Each of the line cards 58 comprises a card CPU subsystem 68 for providing the control, administration and configuration of the line card. A detailed block diagram of the CPU subsystem suitable for use in both line card CPU subsystems and the switch card CPU subsystem is shown in FIG. 6. The CPU subsystem, generally referenced 80, comprises a central processor 82, e.g., CPU, and both volatile and non-volatile memory including RAM memory 88 for storing data and application program code, Flash memory 86 and/or ROM memory 90 for storing boot and application code and EEPROM 84 for storing configuration data. The provider switch may also comprise magnetic storage device means for storing application programs and data. The CPU communicates to the packet processing engine, memory peripherals and other support devices via a bus 100. Note that depending on the implementation, the line cards may not have a CPU subsystem or may have a minimal CPU subsystem, such as without external interfaces.

The central processor 82 implements the major functionality of the control and management planes of the line card including higher software layer processing. Note that the central processor may be implemented in any suitable manner such as a microcontroller, microprocessor, microcomputer, ASIC core, FPGA core, central processing unit (CPU) or digital signal processor (DSP) or any other computing means.

The CPU subsystem also comprises a NIC 92 for providing an out of band interface for connecting to external entities such as a craft for local maintenance and configuration purposes, an NMS 96 for centralized provisioning, administration and control or a Local Area Network (LAN). The CPU subsystem switch may comprise additional interfaces, such as a serial interface for connecting to a PC for configuration purposes. Note that these interfaces are typically part of the CPU subsystem that manages the chassis.

The network device also comprises an optional user interface 94 adapted to respond to user/operator inputs and commands and to provide feedback and other status information. A host/user interface 94 enables communication with a user or host-computing device 98. The host may be adapted to configure, control and maintain the operation of the provider switch. Note that these interfaces are typically part of the CPU subsystem that manages the chassis.

In the ingress direction, data output from the queues on each of the line cards is forwarded to the switching matrix. The switch matrix implements the switching fabric (switching matrix block 72) for providing the switching functionality of the provider switch. A switch CPU subsystem 74 (described supra) provides a centralized processing function for the switch matrix. The switch CPU subsystem may also serve as the central CPU for the chassis, optionally residing on a separate card and managing chassis resources such as fans and power, as well as providing a single point of management for the entire chassis, i.e., representing the other cards to the user or craft. The switch CPU subsystem may comprise the CPU subsystem shown in FIG. 5 and described hereinabove. Note that depending on the specific implementation, the switching matrix may comprise, for example, hardware for performing VLAN tagging, MPLS, Frame Relay, ATM switching, CSIX, OIF-SPI.4, or any other switch matrix to network interface protocol.

In the egress direction, the switch matrix forwards the traffic towards the egress port, through the egress queue which is the destination queue. The egress queue sends flow control to the switch matrix when it becomes full (or almost full). The switch matrix propagates the flow control to the relevant ingress queues, which are those that sent packets towards that egress queue.

A plurality of provider switches may be connected to each other using any topology. The switches may support any kind of a switching technology, including MAC-based switching, VLAN-based switching, MPLS, ATM, etc. Alternatively, the network may comprise only provider edge switches whereby a plurality of provider edge switches are connected in a ring topology.

The provider switch comprises computer readable storage medium for storing program code and data which may include any suitable memory means including but not limited to magnetic storage, optical storage, CD-ROM drive, ZIP drive, DVD drive, DAT cassette, semiconductor based volatile or non-volatile memory or any other memory storage device.

Depending on the implementation, software operative to implement the policer machine of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform mechanisms and methods of the present invention or any portion thereof may also reside, in whole or in part, in the static or dynamic main memories or in firmware within the processor of the switch (i.e. within microcontroller, microprocessor, microcomputer, DSP, etc. internal memory).

Policer Machine

Figure 7:
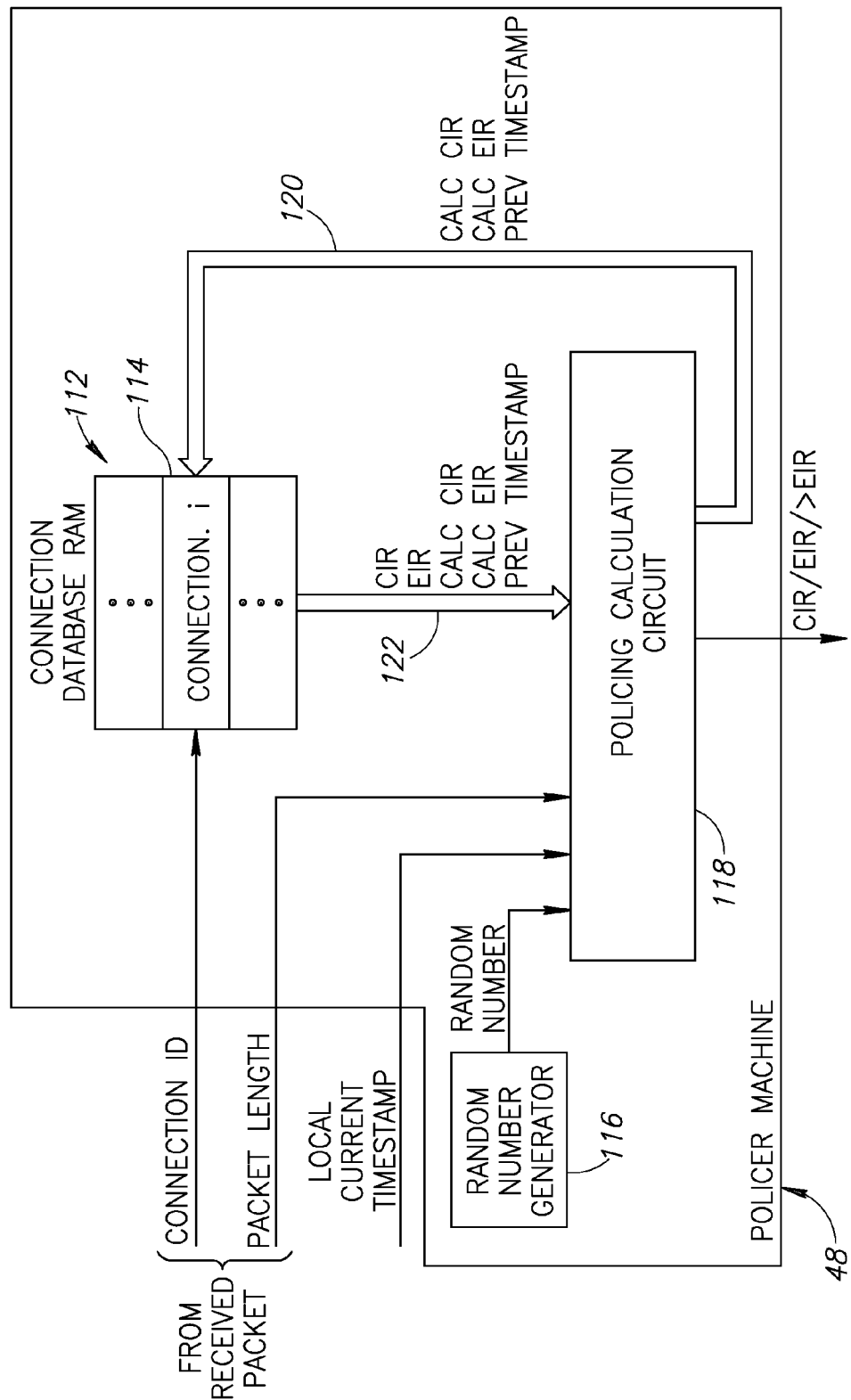
FIG. 7 is a block diagram illustrating an example embodiment of the policer constructed in accordance with the present invention.

The policer machine will now be described in more detail. A block diagram illustrating an example embodiment of the policer constructed in accordance with the present invention is shown in FIG. 7. The policer machine, generally referenced 48, comprises a connection database 112, a random number generator 116 and a policing calculation circuit 118. The connection database may be implemented in any suitable manner such as in external memory, e.g., RAM, NVRAM, etc. and is adapted to store a plurality of connection related information.

Note that for illustration purposes only, the policer machine shown in FIG. 7 is adapted for use with a sliding window based policer. It is appreciated that one skilled in the art can apply the principles of operation of this policer machine to other types of policers as well without departing from the scope of the invention.

The policing calculation circuit is adapted to receive several rate parameters via signals lines 122 that are stored in the connection database according to a connection ID. The connection ID of received packets is used as the index to the connection database. For each connection i, the following 32-bit parameters are stored:
 1. CIR
 2. EIR
 3. calculated (or previous) CIR
 4. calculated (or previous) EIR
 5. previous timestamp The circuit also receives the packet length of the received packet, the current locally generated timestamp and a random number generated by the random number generator 116. The policing calculation circuit uses these inputs to make a determination whether to pass the packet, mark it discard eligible (DE) or drop the packet, i.e. the packet is CIR, EIR or exceeds EIR, respectively.

In addition to the policer decision, updated values of CIR and EIR and the current timestamp are written back to the connection database corresponding to the packet's connection ID. The updated value of CIR is stored as the new calculated or previous CIR, the updated value of EIR is stored as the new calculated or previous EIR and the timestamp is stored as the previous timestamp. These three parameters are then used in calculating the policing decision for the next packet.

In accordance with the present invention, the policing calculation circuit utilizes a random number to randomize the rate threshold CIR and EIR used in making the policing decision. This functions to scatter the thresholds around a central value thus eliminating the "lockup" problem associated with prior art policers.

Random Number Generator

Figure 8:
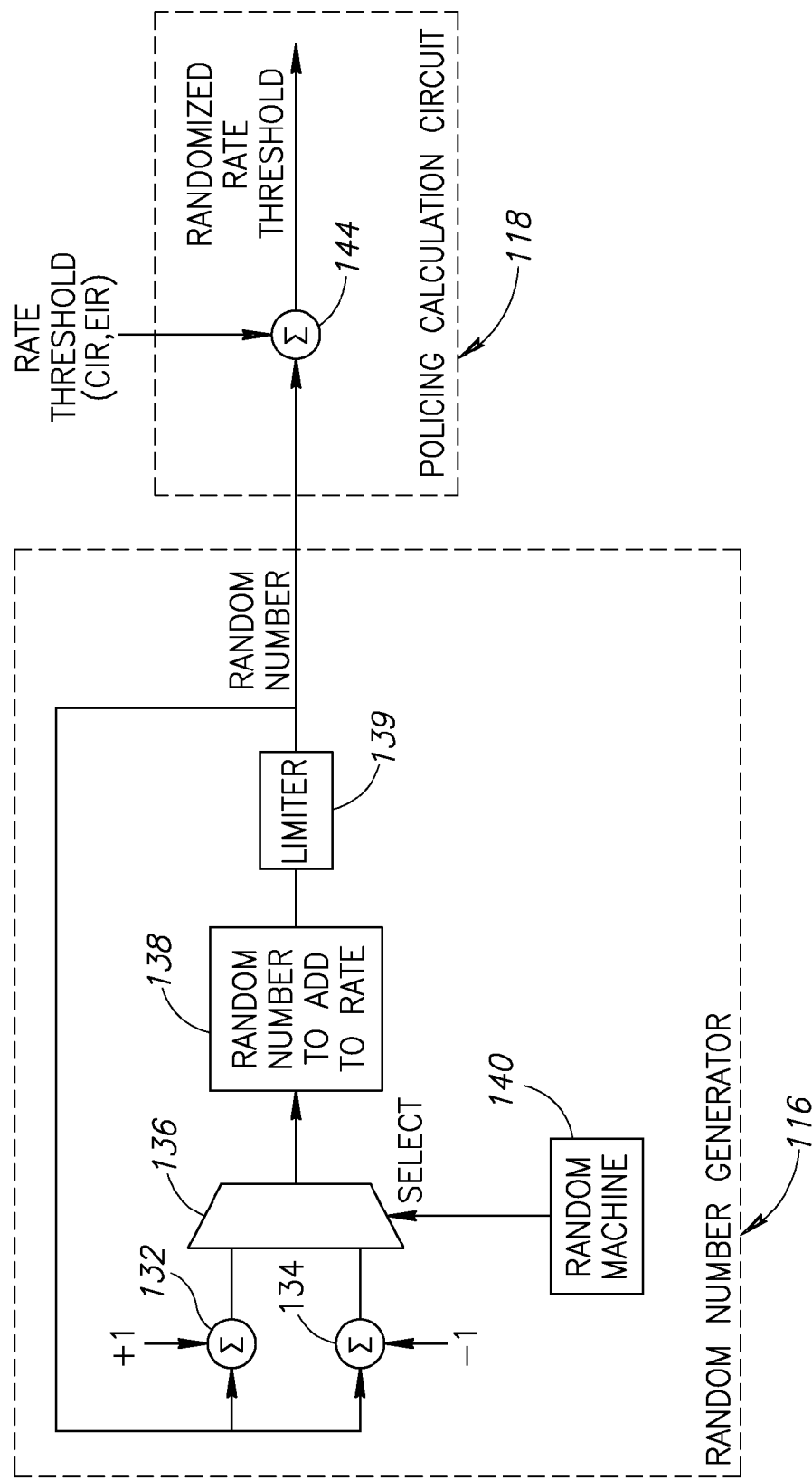
FIG. 8 is a block diagram illustrating the random number generator of the policer in more detail.

The random number generator will now be described in more detail. A block diagram illustrating the random number generator of the policer in more detail is shown in FIG. 8. The random number generator, generally referenced 116, can be constructed using any well-known technique for generating random numbers. Regardless of the manner of generating the random number, it is important to note that the number itself is not used in the calculation. Rather, the random number is added to one of the parameters or entities in the calculation. In the case of a sliding window based policer, for example, the random number is added to the rate threshold rather than be used by itself.

With reference to FIG. 8, the random number generator 116 comprises a random machine 140, adders 132, 134, register 138, limiter 139 and multiplexer 136. A fixed value +1 is input to adder 132 while a value of −1 is input to adder 134. The output of each adder is input to one of two inputs of the two to one multiplexer 136. The output of the multiplexer is stored in register 138. Thus, each cycle, the number to be added to the rate threshold is either incremented or decremented depending on the state of the select line to the multiplexer. The random number generated is added to the rate threshold (i.e. CIR or EIR) via adder 144 within the policing calculation circuit 118.

The random machine generates the select input command (i.e. 0 or 1) to the multiplexer in a random fashion. The optional limiter limits the range of the random number to a desired range. Note that the amount to be incremented or decremented can be set to any desired number. Experiments performed by the inventors have found an increment/decrement of 12 and a limit of +/−1000 bytes for the random number range yields satisfactory results. The optimal parameters are likely to be different, however, for different implementations of the policer.

Figure 9:
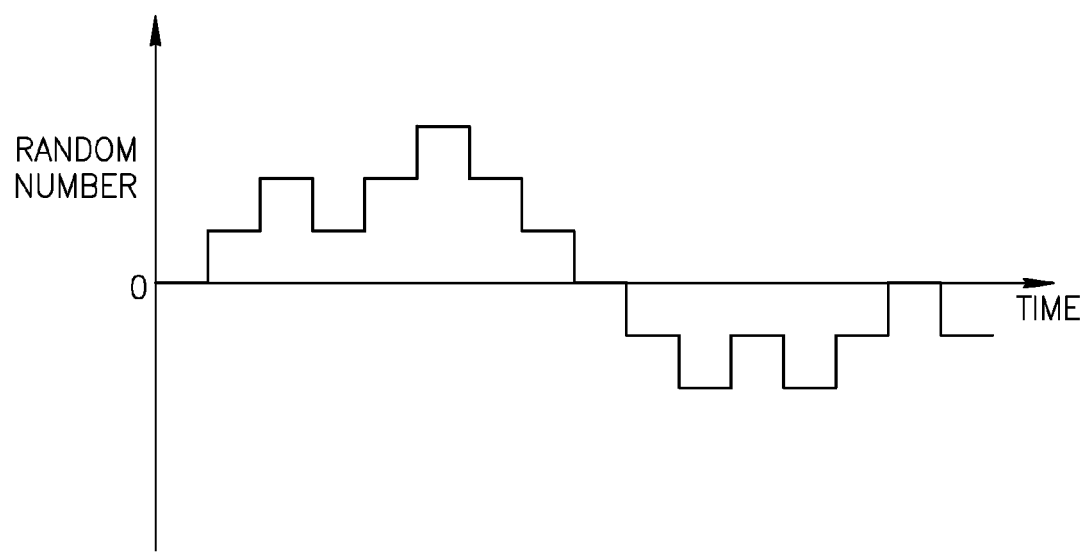
FIG. 9 is a graph illustrating an example sequence of random numbers generated by the random number generator.

An example sequence of random numbers generated by the random number generator is shown in FIG. 9. In this example, the random number is incremented/decremented by one each cycle. Thus, the value of the random number does not change by more than one unit each cycle.

Figure 10:
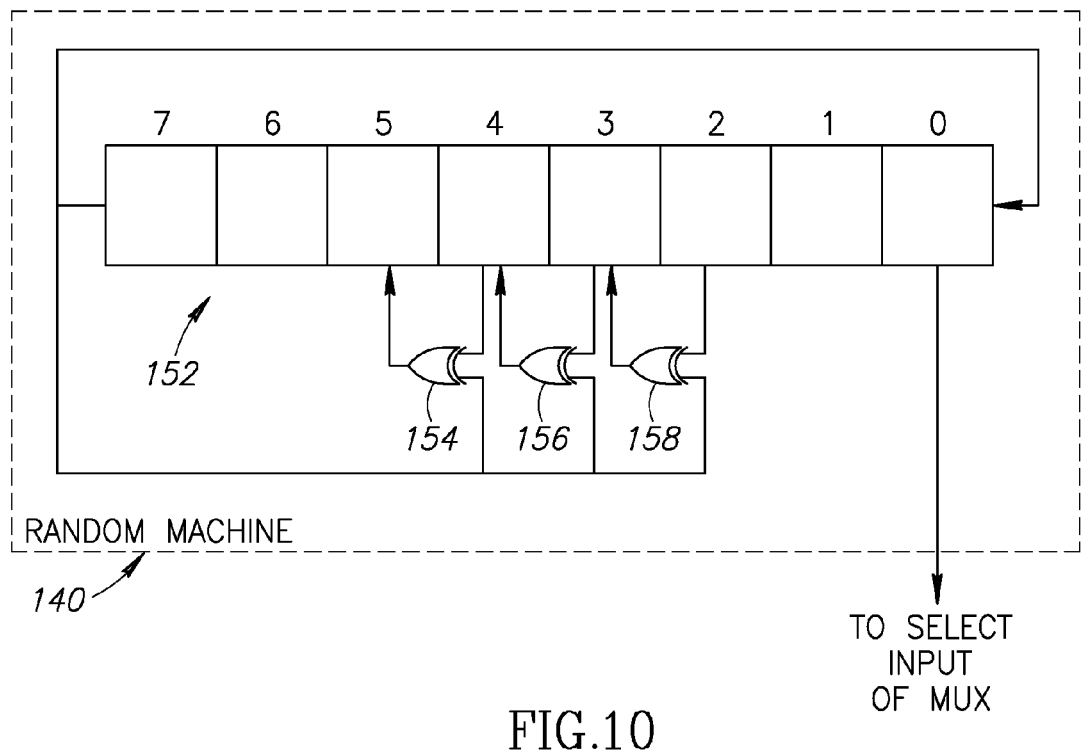
FIG. 10 is a block diagram illustrating the random machine portion of the random number generator in more detail.

A block diagram illustrating the random machine portion of the random number generator in more detail is shown in FIG. 10. The random machine, generally referenced 140, comprises an 8-bit cyclic shift register 152 with several taps XORed and fed back to bits in the register. In particular, taps at bits 2, 3 and 4 are XORed with the MSB via XOR gates 158, 156, 154, respectively. The outputs of the XOR gates are written to the respective next bit in the register. Thus, the output of XOR 158 is written to bit 3, the output of XOR 156 is written to bit 4 and the output of XOR 154 is written to bit 5. The LSB of the shift register is taken as the select line input to the multiplexer 136 (FIG. 8).

At power up, reset, startup, etc., the shift register is seeded with an initial value (i.e. seed), which is configured by software or other higher level entity along with the increment/decrement steps and the limiter range. Upon the arrival of each packet, the random machine is clocked and the contents of the register shifted accordingly. The LSB of the vector constitutes the multiplexer select line wherein a '1' indicates an increment operation and a '0' indicates a decrement operation.

Sliding Window Based Policer Machine

The operation of the sliding window based policer machine will now be described in more detail. As described supra, the policing machine received receives for each packet information about the packet length and connection ID. The machine uses the connection database stored in external memory for the actual policing calculation. The policer operates in three main stages:
 1. Memory read (6 cycles)
 2. Processing (16 cycles)
 3. Memory write (4 cycles)

During the memory read stage, CIR and EIR parameter information is read from the database. The CIR and EIR rate thresholds are configured by the software once when the connection is provisioned. Also read are the current CIR and the current EIR (i.e. last calculated), and the previous timestamp. The policing circuit requires 16 cycles to generate the policing result. During the memory write stage the information being written includes the updated current CIR and update current EIR and timestamp.

Figure 11:
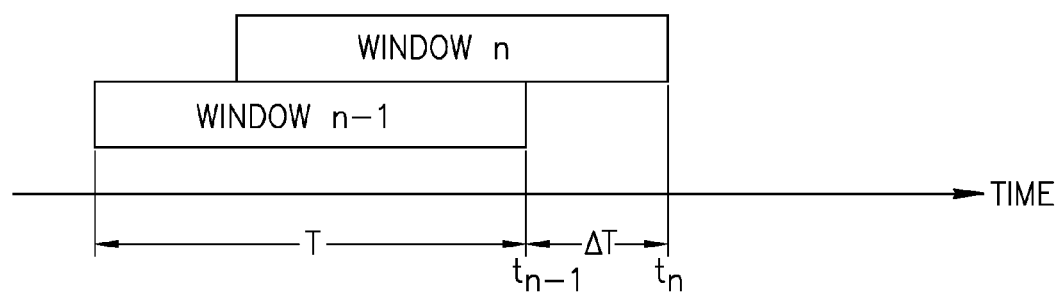
FIG. 11 is a diagram illustrating the sliding window technique used in one embodiment of the policer of the present invention.

The policing machine of the present invention is operative to accumulate a number of bytes in a given sliding time window. Given the configured transmission rate (i.e. CIR and EIR), it knows how many bytes are allowed during each time window. The policer algorithm, as shown in FIG. 11 and Equation 1 below, uses a sliding window to calculate on a per packet basis the new accumulated byte total.

$$N_n = \frac{T - \Delta T}{T} \cdot N_{n-1} + B < N_{max} + RND \quad (1)$$

Note that this calculation is performed for both CIR and EIR traffic. Equation 2 below is specifically for CIR traffic.

$$N_n^c = \frac{T_c - \Delta T_c}{T_c} \cdot N_{n-1}^c + B < N_{max}^c + RND \quad (2)$$

where
- $T_c$ is the CIR burst window size
- $N_n^c$ is the updated number of CIR bytes in the window after the arrival of the current packet
- $N_{n-1}^c$ is the number of CIR bytes in the window after the arrival of the previous packet (i.e. the current CIR value read from the connection database)
- B is the current packet size in bytes
- $N_{max}^c$ is the configured CIR rate (i.e. number of bytes in the window)
- RND is a random number Equation 3 below is specifically for EIR traffic.

$$N_n^e = \frac{T_e - \Delta T_e}{T_e} \cdot N_{n-1}^e + B < N_{max}^e + RND \quad (3)$$

where
- $T_e$ is the EIR burst window size
- $N_n^e$ is the updated number of EIR bytes in the window after the arrival of the current packet
- $N_{n-1}^e$ is the number of EIR bytes in the window after the arrival of the previous packet (i.e. the current EIR value read from the connection database)
- B is the current packet size in bytes
- $N_{max}^e$ is the configured EIR rate (i.e. number of bytes in the window)
- RND is a random number Using the size B of the currently received packet in bytes plus the previous accumulated value, the policing machine calculates an updated value for the accumulated bytes. The value for the accumulated bytes is updated whenever a packet arrives. If no packet arrives, the accumulated value can be updated every window time, every other window or in accordance with any other time scheme or not all (i.e. only when a packet arrives after a long waiting time). In the latter case, when a packet does arrive, the time that has passed since the last packet arrival, which was tracked and saved, is retrieved and used to update the accumulated byte value. Note that a packet can arrive at any point within a window time frame.

Note that the value of $\Delta T$ can be constant, set to represent per packet or set to represent time. In the event no packets are received (i.e. B=0), the accumulated byte value simple decays over time. For every incoming packet the policing machine checks whether the accumulated bits in the past time window exceeded the rate threshold. If the accumulated bits were below the threshold, the bits in the packet will be accumulated and the packet will be allowed to pass. If the accumulated bits were over the threshold, the packet will be dropped, and the number of bits in the packet will not be taken into account.

The randomized CIR and EIR rate thresholds are generated by adding the respective CIR and EIR rate thresholds to the random value output by the random number generator. Once the comparisons in Equations 2 and 3 are complete, the policer can make a determination on the received packet as follows. If the updated current EIR $N_n^e$ is greater than the randomized EIR rate threshold than the packet is dropped. If the updated current EIR $N_n^e$ is less than or equal to the randomized EIR rate threshold than if the updated current CIR $N_n^e$ is greater than the randomized CIR rate threshold, then the current rate is between CIR and EIR and the packet is marked as discard eligible. If the updated current CIR $N_n^c$ is less than or equal to the randomized CIR rate threshold, then the packet is forwarded (i.e. passes). This is illustrated in Listing 1 below.

Listing 1: Sliding Window Based Policer Algorithm

```
if Nₙᵉ > Nₘₐₓᵉ + RND     * current rate exceeds randomized configured
   drop the packet        EIR
else
   if Nₙᶜ > Nₘₐₓᶜ + RND   * current rate is between randomized CIR
      mark packet as DE   and EIR
   else                   * current rate is less than randomized CIR
      forward packet
   end if
end if
```

Thus, the present invention adds a random dimension to the rate threshold. The effect of randomizing the rate threshold is that the policing machine applies a scattering or wave of rate values centered around the desired rate to the incoming traffic rather than applying a fixed rate threshold that has a constant value.

Figure 2:
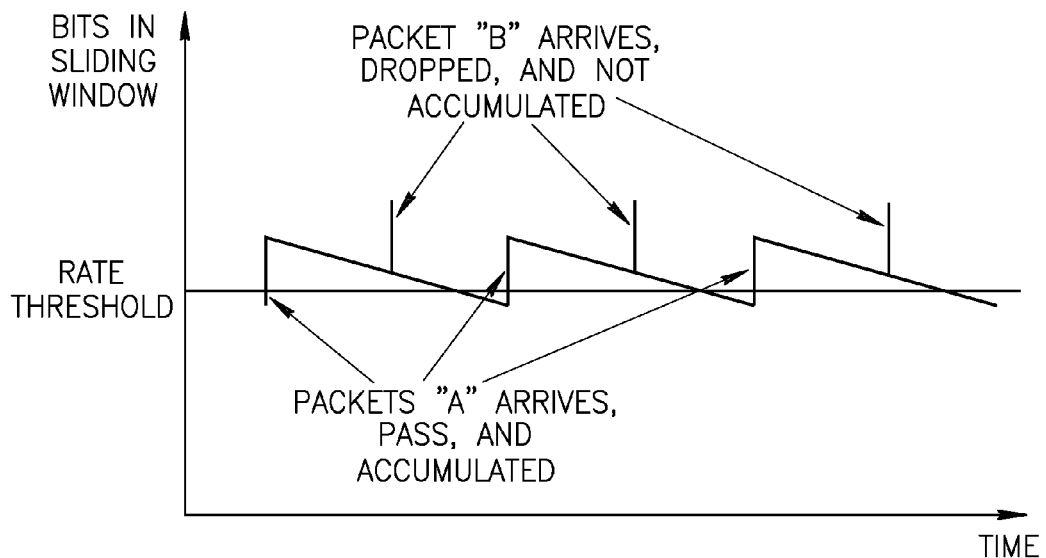
FIG. 2 is a diagram illustrating the behavior of a prior art policing machine that incorporates a sliding window mechanism.
Figure 12:
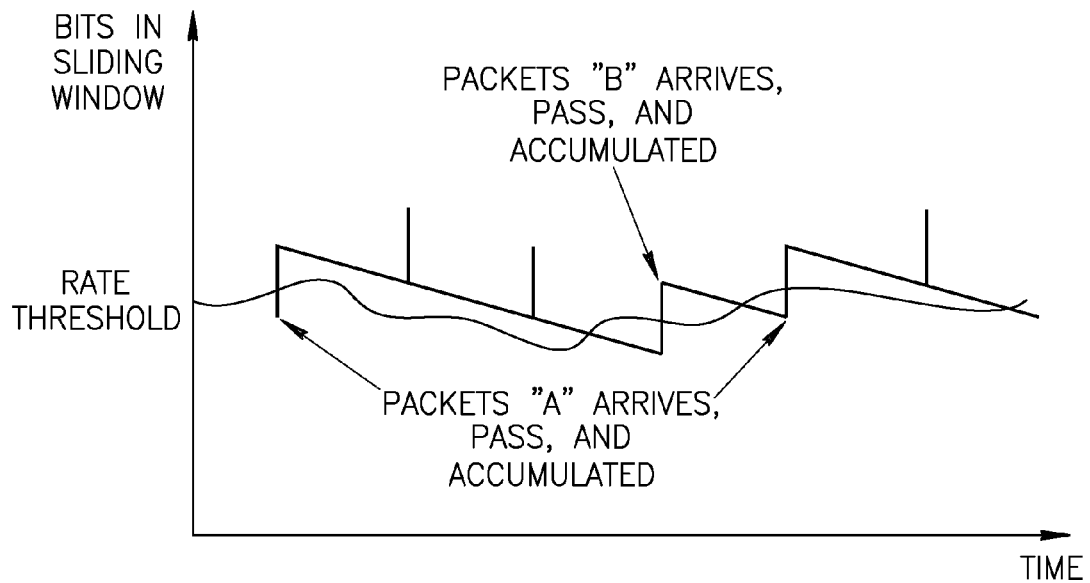
FIG. 12 is a diagram illustrating the behavior of the policer of the present invention incorporating a sliding window mechanism.

A diagram illustrating the behavior of the policer of the present invention incorporating a sliding window mechanism is shown in FIG. 12. With reference to the example presented supra in connection with FIG. 2, the results of FIG. 12 were obtained for the same incoming traffic pattern and rate configuration which are now input to the sliding window based policing machine of the present invention. The sliding window based policer is operative to apply a randomized rate threshold to the incoming traffic flows rather than a constant one. Changing the rate threshold in a random manner yields desirable results whereby the available bandwidth is now shared substantially equally between the two traffic flows.

In the example of FIG. 12, the same six packets are received. In this case, however, two packets from node A pass and one packet from node B passes. This is compared with all three packets from node A being passed and all packets from node B being dropped (see FIG. 2). Over time, the packets dropped will be split equally between the two traffic flows due to the randomization of the rate thresholds. This results in much more desirable network behavior.

Thus, varying the rate threshold in a policing machine in a random manner eliminates the problem of "lockup" or "synchronization" between traffic flow behavior and corresponding policer action such that some flows are always dropped, while other flows always pass.

Token Bucket Based Policer Machine

As described supra, the present invention provides a second embodiment comprising a token bucket based policer. The operation of this policer is similar to that of the sliding window policer with the exception of the sliding window algorithm which is replaced with a token bucket algorithm. The operation of the other portions of the policer are substantially the same and will not be repeated here.

Figure 13:
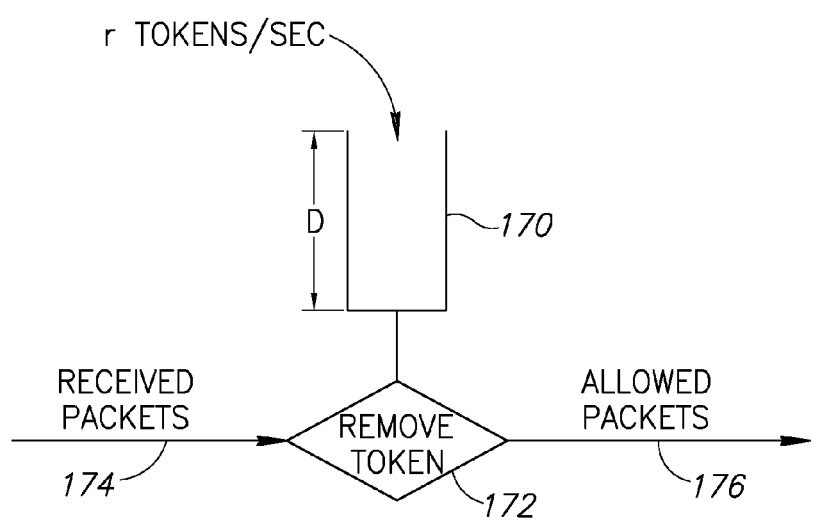
FIG. 13 is a diagram illustrating the token bucket technique used in another embodiment of the policer of the present invention.

A diagram illustrating the token bucket technique used in a second embodiment of the policer of the present invention is shown in FIG. 13. A token bucket flow is defined by (r, D) wherein r denotes the rate in tokens/sec at which tokens (or credits) are accumulated and D is the depth of the token pool (in bytes). New tokens are added to the bucket 170 at a rate of r tokens/sec, the maximum number of tokens that can be accumulated is D bytes. If the bucket becomes full, the incoming tokens are discarded.

Normally, data flows into the mechanism from the left in quanta called packets 174. Tokens flow into the bucket from the top at rate r. Each token is worth a defined number of bytes. To aid in understanding the principles of the invention, each token is equivalent to one byte.

In operation, when a packet arrives from the left, if the number of tokens in the bucket at that time is at least equal to the number of bytes in the packet, the policing decision for that packet is to "pass" the packet (decision 172). If there are not enough tokens in the bucket, then the policing decision for that packet is to "drop" the packet. An expression for updating the bucket depth is given below in Equation 4.

$$D(n)=D(n-1)+\{T(n)-T(n-1)\}\cdot CIR \quad (4)$$

where
  $D(n)$ represents the updated current bucket depth in bytes
  $D(n-1)$ represents the previously calculated bucket depth in bytes
  CIR is the configured CIR rate threshold
  B number of bytes in the received packet
  $T(n)$ current timestamp
  $T(n-1)$ previous timestamp
  RND random value generated by the random value generator Once the current bucket depth is updated, the policer checks if the bucket is deep enough to allow the packet to pass using the following comparison.

$$D(n)>B+RND \quad (5)$$

If it is, the bucket depth is updated with the packet length. The algorithm is provided in Listing 2 below.

---
Listing 2: Token Bucket Based Policer Algorithm

```
if D(n) > B + RND    * bucket is deep enough to allow the packet to pass
  pass the packet
  D(n) = D(n) - B    * update the bucket depth with the packet length
else
  drop the packet    * bucket is not deep enough
end if
```
---

Thus, the policer of the present invention is operative to add a random dimension to the length of the received packet. It is appreciated that the randomization of the comparison could be implemented in the other entities as well without a reduction in performance. For example, the random number RND could be added to the bucket depth $D(n)$ instead of the packet length B.

Effectively, a random dimension is added to the bucket empty (i.e. zero tokens) threshold. The result of randomizing the bucket empty threshold is that the policing machine applies a scattering or wave of token values above the bucket empty threshold rather than use a value of zero as the fixed bucket empty threshold value.

Figure 3:
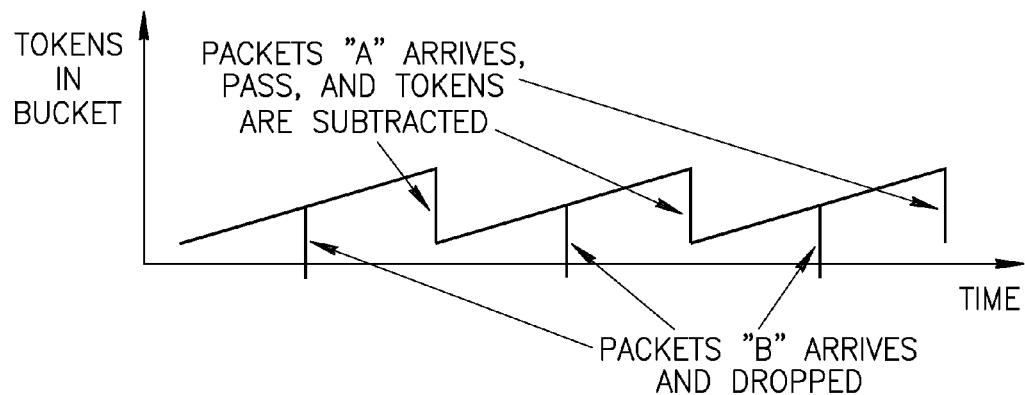
FIG. 3 is a diagram illustrating the behavior of a prior art policing machine that incorporates a token bucket mechanism.
Figure 14:
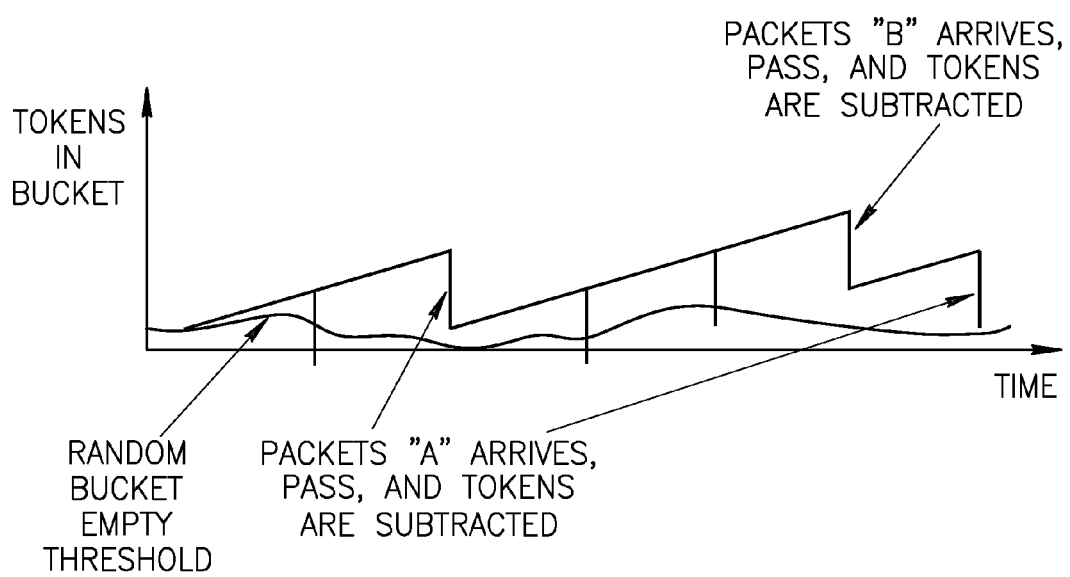
FIG. 14 is a diagram illustrating the behavior of the policer of the present invention incorporating a token bucket mechanism.

A diagram illustrating the behavior of the policer of the present invention incorporating a token bucket mechanism is shown in FIG. 14. With reference also to the example presented supra in connection with FIG. 3, results are presented which were obtained for the same incoming traffic pattern and rate configuration but which are now input to the token bucket policer machine of the present invention which is operative to apply a randomized empty threshold to the incoming traffic flows rather than a value zero.

In the example of FIG. 14, the same six packets are received. The difference, however, is that in this example, only two packets from node A pass and one packet from node B now passes. This is compared with all three packets from node a being passed and all packets from node B being dropped. Note that over time, the number of packets dropped will be split equally between the two flows, due to the randomization of the empty bucket threshold. This results in much more desirable network behavior.

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:
1. A policer for enforcing limits on service level agreement (SLA) applied service traffic rates in a network switch coupled to a network, said network switch adapted to receive a plurality of incoming traffic flows over one or more communication links, comprising:
  a connection database adapted to store a plurality of rate parameters, including one or more desired rate thresholds, corresponding to a connection ID associated with a received packet;
  a random number generator operative to generate a current random number for each received packet, wherein said current random number is calculated by randomly either incrementing or decrementing a previous random number by a predetermined unit each received packet cycle, wherein said random number generator is seeded with an initial value;
  means for calculating a randomized rate threshold as a sum of one of said desired rate thresholds and said current random number thereby generating over time a plurality of rate thresholds scattered around said desired rate threshold; and a policing calculator operative to calculate on a per packet basis a policing decision in accordance with said received packet, said plurality of rate parameters, received packet size and said calculated randomized rate threshold.

2. The policer according to claim 1, wherein said one or more rate thresholds comprises a committed information rate (CIR) threshold and an excess information rate (EIR) threshold.

3. The policer according to claim 1, wherein said plurality of rate parameters comprises a previously calculated committed information rate (CIR) and a previously calculated excess information rate (EIR).

4. The policer according to claim 1, wherein said plurality of rate parameters comprises a previously stored timestamp.

5. The policer according to claim 1, wherein said policer calculator comprising means for implementing a sliding window to determine said policing decision.

6. The policer according to claim 1, wherein said policer calculator comprising means for implementing a token bucket to determine said policing decision.

7. A method of enforcing limits on service level agreement (SLA) applied service traffic rates in a policer within a network switch adapted to receive a plurality of incoming traffic flows, said network switch coupled to a network via one or more communication links, said method comprising the steps of:
   for each packet received, retrieving from a connection database a plurality of rate parameters, including one or more desired rate thresholds, corresponding to a connection ID associated with said received packet;
   generating a current random number, via a random number generator, for each packet received, wherein said current random number is calculated by randomly either incrementing or decrementing a previous random number by a predetermined unit each received packet cycle, wherein said random number generator is seeded with an initial value;
   calculating a randomized rate threshold as a sum of one of said desired rate thresholds and said current random number thereby generating over time a plurality of rate thresholds scattered around said desired rate threshold; and
   calculating on a per packet basis a policing decision based on said received packet, said plurality of rate parameters, received packet size and said calculated randomized rate threshold.

8. The method according to claim 7, wherein said one or more rate thresholds comprises a committed information rate (CIR) threshold and an excess information rate (EIR) threshold.

9. The method according to claim 7, wherein said plurality of rate parameters comprises a previously calculated committed information rate (CIR) and a previously calculated excess information rate (EIR).

10. The method according to claim 7, wherein said plurality of rate parameters comprises a previously stored timestamp.

11. The method according to claim 7, wherein said step of calculating utilizes a sliding window algorithm in determining said policing decision.

12. The method according to claim 7, wherein said step of calculating utilizes a token bucket algorithm in determining said policing decision.

13. A policer for enforcing limits on service level agreement (SLA) applied service traffic rates in a network switch coupled to a network, said network switch adapted to receive a plurality of incoming traffic flows over one or more communication links, comprising:
   a connection database adapted to store a plurality of committed information rate (CIR) and excess information rate (EIR) desired rate parameters corresponding to a connection ID associated with a received packet;
   a random number generator operative to generate a current random number for each received packet, wherein said current random number is calculated by randomly either incrementing or decrementing a previous random number by a predetermined unit each received packet cycle, wherein said random number generator is seeded with an initial value;
   means for calculating randomized CIR and EIR rate thresholds as a respective sum of said plurality of desired CIR and EIR rate parameters and said current random number thereby generating over time a plurality of rate thresholds scattered around said desired CIR and EIR rate thresholds; and
   a policing calculator operative to:
      establish a current sliding window during which incoming CIR and EIR traffic is accumulated; and
      for each incoming packet, deciding whether to forward, mark as discard eligible or drop said packet as a function of said accumulated CIR and EIR traffic and said calculated randomized CIR and EIR rate thresholds.

14. A method of enforcing limits on service level agreement (SLA) applied service traffic rates in a policer within a network switch adapted to receive a plurality of incoming traffic flows, said network switch coupled to a network via one or more communication links, said method comprising the steps of:
   for each packet received, retrieving from a connection database a plurality of committed information rate (CIR) and excess information rate (EIR) desired rate parameters corresponding to a connection ID associated with a received packet;
   generating a current random number for each packet received via a random number generator, wherein said current random number is calculated by randomly either incrementing or decrementing a previous random number by a predetermined unit each received packet cycle, wherein said random number generator is seeded with an initial value;
   calculating randomized CIR and EIR rate thresholds as a respective sum of said CIR and EIR desired rate parameters with said current random number thereby generating over time a plurality of rate thresholds scattered around said CIR and EIR desired rate parameters;
   establishing a current sliding window during which incoming CIR and EIR traffic is accumulated; and
   for each incoming packet, deciding whether to forward, mark as discard eligible or drop said packet as a function of said accumulated CIR and EIR traffic and said calculated randomized CIR and EIR rate thresholds.

15. A policer for enforcing limits on service level agreement (SLA) applied service traffic rates in a network switch coupled to a network, said network switch adapted to receive a plurality of incoming traffic flows over one or more communication links, comprising:
   a connection database adapted to store a plurality of desired rate parameters corresponding to a connection ID associated with a received packet;
   a random number generator operative to generate a current random number for each received packet, wherein said current random number is calculated by randomly either incrementing or decrementing a previous random number by a predetermined unit each received packet cycle, wherein said random number generator is seeded with an initial value; and a token bucket based policing calculator operative to:
for each received packet, calculate an updated token bucket depth as a function of a previously calculated token bucket depth and said desired rate parameters; and pass a received packet if said updated token bucket depth is greater than a sum of the number of bytes in said received packet and said current random number.

16. A method of enforcing limits on service level agreement (SLA) applied service traffic rates in a policer within a network switch adapted to receive a plurality of incoming traffic flows, said network switch coupled to a network via one or more communication links, said method comprising the steps of:

for each packet received, retrieving from a connection database a plurality of desired rate parameters corresponding to a connection ID associated with a received packet;

generating a current random number, via a random number generator, for each packet received, wherein said current random number is calculated by randomly either incrementing or decrementing a previous random number by a predetermined unit each received packet cycle, wherein said random number generator is seeded with an initial value;

for each received packet, calculating an updated token bucket depth as a function of a previously calculated token bucket depth and said desired rate parameters; and passing a received packet if said updated token bucket depth is greater than a sum of the number of bytes in said received packet and said current random number.

17. A provider core switch for use in the middle of an Ethernet based network, comprising:

a plurality of line cards, each line card incorporating one or more ports for interfacing said provider switch to other provider switches, each line card comprising:

one or more ports, each port coupled to a network communications link;

a packet processing engine coupled to said plurality of ports, said packet processing engine for determining a forwarding decision and destination queue for each ingress packet;

wherein said packet processing engine comprises a policer for enforcing limits on service level agreement (SLA) applied service traffic rates, said policer operative to:

generate a current random number, via a random number generator, for each packet received, wherein said current random number is calculated by randomly either incrementing or decrementing a previous random number by a predetermined unit each received packet cycle, wherein said random number generator is seeded with an initial value;

for each received packet, calculate an updated token bucket depth as a function of a previously calculated token bucket depth and one or more desired rate parameters;

pass a received packet if said updated token bucket depth is greater than the sum of the number of bytes in said received packet and said current random number;

a queue manager coupled to said packet processing engine; and switching means coupled to said queue manager and adapted to provide switching fabric functionality to said provider core switch.

18. A method of enforcing limits on service level agreement (SLA) applied service traffic rates in a policer within a network switch adapted to receive a plurality of incoming traffic flows, said network switch coupled to a network, said method comprising the steps of:

generating a current random number, via a random number generator, for each packet received, wherein said current random number is calculated by randomly either incrementing or decrementing a previous random number by a predetermined unit each received packet cycle, wherein said random number generator is seeded with an initial value;

calculating a randomized rate threshold as a sum of a desired rate threshold and said current random number thereby generating over time a plurality of rate thresholds scattered randomly around said desired rate threshold; and calculating on a per packet basis a policing decision based on said randomized rate threshold and received packet size.

19. A method of enforcing limits on service level agreement (SLA) applied service traffic rates in a policer within a network switch adapted to receive incoming traffic flows, said network switch coupled to one or more communication links, each incoming traffic flow having a corresponding desired rate threshold, said method comprising the steps of:

generating a current random number, via a random number generator, for each packet received, wherein said current random number is calculated by randomly either incrementing or decrementing a previous random number by a predetermined unit each received packet cycle, wherein said random number generator is seeded with an initial value;

calculating a randomized rate threshold for each received packet as a sum of a desired rate threshold and said current random number thereby generating over time a plurality of rate thresholds scattered randomly around said desired rate threshold; and calculating on a per packet basis a policing decision for each received packet in accordance with said randomized rate threshold and received packet size.

* * * * *